United States Patent [19]

Okada et al.

[11] 3,926,551

[45] Dec. 16, 1975

[54] METHOD OF MAKING DURABLE ANTISTATIC AND HYGROSCOPIC POLYESTER FIBERS

[75] Inventors: Toshio Okada, Kadoma; Yasunao Shimano, Takatsuki; Ichiro Sakurada, Kyoto, all of Japan

[73] Assignee: Japan Atomic Energy Research Institute, Tokyo, Japan

[22] Filed: Nov. 27, 1972

[21] Appl. No.: 309,686

[30] Foreign Application Priority Data
Nov. 26, 1971 Japan.............................. 46-94533
Nov. 26, 1971 Japan.............................. 46-94534

[52] U.S. Cl. ................ 8/115.5; 8/115.6; 117/138.8
[51] Int. Cl............................................ D06m 13/20
[58] Field of Search ........ 8/115.5, 115.6; 117/138.8

[56] References Cited
UNITED STATES PATENTS

| | | | |
|---|---|---|---|
| 3,644,081 | 2/1972 | Matsuda et al. ..................... | 8/115.6 |
| 3,794,465 | 2/1974 | Baron ................................. | 8/115.6 |

*Primary Examiner*—Stephen J. Lechert, Jr.
*Attorney, Agent, or Firm*—Browdy and Neimark

[57] ABSTRACT

A durable antistatic and hygroscopic polyester fiber comprising ethylene terephthalate component is obtained by forming a specific water-insoluble polymer on the surface and inside of the fiber material. Said water-insoluble polymer comprises copolymerizing a mixture of poly (ethylene glycol) dimethacrylate and/or diacrylate and an alkali metal salt and/or ammonium salt of an ethylenically unsaturated organic acid.

6 Claims, No Drawings

METHOD OF MAKING DURABLE ANTISTATIC AND HYGROSCOPIC POLYESTER FIBERS

BACKGROUND OF THE INVENTION

1. Field of the Invention

This invention is directed to a method of imparting durable antistatic and hygroscopic properties to polyester fiber materials such as poly (ethylene terephthalate) fiber, and the resulting polyester fiber materials.

2. Description of the Prior Art

Most synthetic fibers have many excellent chemical and physical properties. Especially, a polyester fiber comprising poly (ethylene terephthalate) component possesses many excellent properties for practical uses owing to its heat set properties. On the other hand, it has the defect of being inferior in the hygroscopic and antistatic properties.

It has been known that the synthetic fibers such as "Nylon" are graft-polymerized with sodium acrylate or sodium styrene-sulfonate by means of an ionizing radiation. But this method provides the products inferior in hand and feeling of the fiber or fabrics.

It has also been known that an aqueous solution of a mixture comprising methylol acrylamide, sodium styrene-sulfonate, acrylic acid and the like is impregnated in the synthetic fibers such as "Nylon" and then the fibers are irradiated with an ionizing radiation. This method is effective in the treatment of "Nylon" fiber or a blended yarn of a polyester fiber and cotton, however, it is not so effective in the treatment of a poly (ethylene terephthalate) fiber. Furthermore, the defect in this method is that the aqueous monomeric mixture to be polymerized contains alkaline nitrogen atom; upon washing, the treated fabrics are charged to plus (+) since the polymer derived from the monomer component is cationically active, and the dirts which were charged to minus (−) are ready to attach to the fiber.

Also known has been the method of obtaining an antistatic effect by graft polymerizing a methacrylate containing poly (ethylene glycol) group on a textile by way of radical reaction mechanism. However, this method is not practicable since the treated fiber more apt to be oily-stained than an untreated fiber, and is apt to be restained by a sulfonated soap upon dry cleaning.

SUMMARY OF THE INVENTION

This invention relates to a novel polyester fiber material having excellent antistatic and hygroscopic properties, and a novel method for imparting the excellent antistatic and hygroscopic properties to polyester fiber materials.

The novel polyester fiber of this invention is prepared by impregnating a mixture of a poly (ethylene glycol) dimethacrylate and/or diacrylate and an alkali metal salt or ammonium salt of an ethylenically unsaturated organic acid such as styrene-sulfonic acid, methacrylic acid, acrylic acid and the like in a polyester fiber material, and forming an insoluble polymer on the surface and/or inside of the fiber by a radical polymerization initiating means such as irradiation with an ionizing radiation or light and/or addition of a radical initiator and/or heating.

The term "polyester fiber" in this invention means (i) a poly (ethylene terephthalate) fiber, or a copolymeric polyester fiber comprising ethylene terephthalate and another monomer or monomers such as ethylene diisophthalate in which the copolymeric polyester preferably contains ethylene terephthalate as major component; (ii) a polyester blended fiber such as blended yarn fabrics and union fabrics comprising a polyester fiber as defined in the above (i) preferably as major part, and other fiber materials such as a cellulose, a wool, a polyamide fiber, a polyacrylonitrile fiber, a polyolefin fiber and the like; and any type of the fibers such as filament, tow, yarn, fabric, non-woven fabric, felt, or clothing. Hereinafter, these are referred to as polyester fiber materials.

DESCRIPTION OF THE PREFERRED EMBODIMENT

In the present invention, is advantageously employed poly (ethylene glycol) dimethacrylate and/or diacrylate in which molecular weight (M.W.) of poly (ethylene glycol) group is generally about 300 – 10,000. The dimethacrylate and/or diacrylate having poly (ethylene glycol) group of about 400 – 6,000 in M.W. is preferably employed, which corresponds to $n = 8$ or more in the formula of

$$CH_2 = C.RCOO - (CH_2CH_2O)_n - OCOC.R = CH_2$$

wherein R is methyl group or hydrogen. When $n$ is smaller than 7, both the feeling and softness of the treated fabric are rather impaired, and copolymerization properties with a salt of unsaturated organic acid is lowered.

The polymerization is generally carried out at room temperature by means of an ionizing radiation. An ionizing radiation typically includes gamma rays, $\beta$ rays, X rays, an electron beam and mixtures thereof. An ultraviolet light from a mercury lamp etc. may also be employed. The dose and dose rate of the ionizing radiation range from just enough to initiate polymerization to just below the amount at which a polyester fiber deteriorates. Generally the dose and dose rate are in the range of about $10^2 - 10^8$ rad and $10^2 - 10^9$ rad/hr. It is preferred to employ an electron beam from an accelerator at a dose rate of about $10^4 - 10^7$ rad/sec. The polymerization is also carried out in the presence of ozone or a radical initiator such as benzoyl peroxide which forms free radicals through decomposition and/or by heating at about 70° – 250°C.

The mixing ratio of poly (ethylene glycol) dimethacrylate and/or diacrylate with an alkali metal salt or ammoniun salt of an unsaturated organic acid is 100 parts : 100 parts or less by weight, generally 100 parts : about 1 – 100 parts by weight, and preferably 100 parts : about 5 – 50 parts by weight. It is convenient to employ the above mixture of monomers as an aqueous solution by using a water-soluble alkali salt of the acidic monomer. The concentration of the solution is not especially restricted, but the amount of the resulting polymer onto the fiber can be controlled by using a suitable concentration of the solution. For instance, the amount of impregnant is controlled by immersing a polyester fiber or fabric in an aqueous solution of the monomers and squeezing it with a mangle. Alternatively, a suitable amount of the solution can be sprayed on a polyester fiber or fabric.

Thus, copolymerization of poly (ethylene glycol) dimethacrylate and/or diacrylate and an alkali metal salt or ammonium salt of an unsaturated organic acid takes place, and simultaneously cross-linking and graft-polymerization to the polyester fiber take place to provide a water-insoluble polymer. These are considered to enhance the durability of the treated fiber of the present invention.

The present invention is in an aspect characterized in that a high energy ionizing radiation such as an electron beam can be employed at room temperature in the reaction system. For instance, the reaction can be completed within several seconds with high commercial efficiency by means of an electron beam from an accelerator.

Generally speaking, polymerization velocity of an alkali metal salt or ammonium salt of a polymerizable acid is slower than that of the polymerizable acid. Therefore, a method has been employed of polymerizing a polymerizable acid such as acrylic acid and then converting said acid component to a salt in order to enhance the antistatic and hygroscopic property of the fiber. According to the present invention, polymerization can be performed faster and simply by using an alkali metal salt or ammonium salt of a polymerizable acid and poly (ethylene glycol) dimethacrylate and/or diacrylate. Furthermore, there is no fear for corrosion of reactor and the like since no acidic monomer is employed.

A polyester fiber or fabric treated by the present invention does not have its original feeling and softness impaired and no coloring takes place, even when more than 10% by weight of the fiber is polymerized onto the fiber. This is the marked difference from the fiber or fabric on which a homopolymer of styrene-sulfonate or an acrylate is deposited according to a conventional method. The product of the present invention has the antistatic and hygroscopic properties as well as durability by washing.

The increase in weight (percent of weight increase) after the treatment by the present invention is not especially restricted and is generally about 0.1 – 20%, but satisfactory antistatic and hygroscopic properties can be obtained with the increase of about 0.2 – 5% by weight of the fiber or fabric to be treated.

Incidentally, this invention is partially related to the copending U.S. application Ser. No. 218,815 filed on Jan. 18, 1972 now U.S. Pat. No. 3,779,881 by the same inventors. In the copending application, poly (ethylene glycol) dimethacrylate, the M.W. of poly (ethylene glycol) group being about 300 – 800, is employed together with an alkali metal salt of ethylenically unsaturated organic acid and is polymerized by means of an ionizing radiation. In this embodiment, an improvement has been made by this invention that poly (ethylene glycol) dimethacrylate, the M.W. of the poly (ethylene glycol) group being about 800 – 10,000 can also advantageously be employed. If required, the applicants are prepared to effect a terminal disclaimer in this respect.

Now the invention is illustrated by way of working examples. These examples are shown for better understanding of the invention and should not be taken as limiting the scope of the invention.

Incidentally, the "static voltage" as shown in the examples is determined by rubbing the sample with cotton fabric, using a rotary static tester, at 24°C and in the atmosphere of 46% R.H. The condition of the measurement is 500 grams of load, 700 r.p.m. and rubbing for 1 minute. The "half period" of static voltage indicates the period of time for the static voltage being lowered to 50% thereof. The "hygroscopic property" is determined by the following manner. A swatch of the sample is supported horizontally and one drop (0.03 gram) of distilled water is applied to the sample from the height of 1 cm above the sample at 25°C and in the atmosphere of 65% R.H. The period of time is indicated by "second" for the water applied being completely absorbed and a peculiar reflection light being not observed.

EXAMPLE 1

A swatch 8 cm × 10 cm of poly (ethylene terephthalate) poplin (yarn size No. 50; count, warp 137 and weft 72) was washed with distilled water at 100°C for 2 hours and dried at a reduced pressure. Then, the swatch was immersed in an aqueous solution of 5% by weight poly (ethylene glycol) diacrylate (hereinafter referred to as PEGDA), the molecular weight (M.W.) of poly (ethylene glycol) group being 616 (tradename NK Ester A-14G) and of 0.5% by weight sodium styrene-sulfonate at room temperature (25°C) for 30 minutes and taken out, and the sample was squeezed between filter paper so that the amount of impregnant was about 40.3% by weight of the fabric. The squeezed sample was put in an aluminium foil bag, and the bag was sealed after passing nitrogen for 2 minutes to replace air therein, followed by irradiation with an electron beam from a Van de Graaf accelerator of 1.5 MeV and 50 μ A using a conveyor. After the irradiation of total dose of 3 Mrad, the sample was taken out of the bag and boiled in 100°C for 2 hours to remove unreacted monomer and water-soluble polymer. After the treatment, the increase in weight of the fabric was 1.9%. The treated fabric was soft, showed a good feeling without coloring, and had the excellent hygroscopic and antistatic properties. As to the hygroscopic property, the treated fabric absorbed water completely in 28 seconds, whereas the untreated fabric took about 500 seconds. As to the antistatic property, the treated fabric showed a static voltage of 390 volts and the half period thereof of 3.5 seconds, whereas the untreated fabric showed 3200 volts and more than 1800 seconds.

For comparison, Example 1 was repeated except for employing PEGDA (NK Ester A-14G) without sodium styrene-sulfonate (hereinafter referred to as NaSS), there were obtained the treated fabrics having weight-increase of 1.5%. The control fabrics showed 295 seconds for absorbing water. The static voltage of the sample was 890 volts and the half period thereof was 34.4 seconds. This control illustrates the excellent effects of the present invention in that the antistatic property and especially the hygroscopic property increase by copolymerizing PEGDA and NaSS, although both antistatic and hygroscopic properties can be improved to some extent by the treatment with PEGDA.

The durability by washing was evaluated in the following manner. 5000 ml of 0.5% aqueous solution of anionic synthetic detergent for textiles ("Hi-top" of Lion Oil and Fat Co., Japan) was employed per 1 gram of the fabric. The treated fabric was washed with the aqueous solution at 60°C for 2.5 hours with stirring. After repeating the washing five times, this corresponding to washing five times by means of an ordinary domestic washing machine, the period of time for water-absorption, static voltage and half period thereof were measured to give 25.5 seconds, 435 volts and 3.7 seconds respectively. These data show that hygroscopic and antistatic properties of the treated fabric are not substantially impaired by way of washing.

EXAMPLE 2

Example 1 was repeated except for changing the mixing ratio and concentration of the aqueous solution of sodium styrene-sulfonate (NaSS) and PEGDA (NK Ester A-23G) having M.W. 1012 of poly (ethylene glycol) group and represented by the formula of $CH_2 = CHCOO(CH_2CH_2O)_{23}COOH = CH_2$. The results are shown in Table 1. Table 1 also shows the results for untreated fabric and those for employing an aqueous solution of NaSS or the NK Ester only. These data clearly show the effect of employing both NaSS and PEGDA.

EXAMPLE 3

Example 1 was repeated except for employing sodium acrylate (hereinafter referred to as NaAA) as an alkali metal salt of an acidic monomer instead of NaSS and PEGDA (NK Ester A-23G). The results exhibited the excellent hygroscopic and antistatic properties as well as durability by washing without changing feeling and color of the fabric, as shown in Table 3.

Table 3

| Composition of the treating solution | | Dose of irradiation (Mrad) | Increase in weight (%) | Static voltage (volt) | | Half period of static voltage (sec) | | Period of time for water-absorption (sec) | |
|---|---|---|---|---|---|---|---|---|---|
| NaAA (%) | NK Ester (%) | | | Before washing | After washing | Before washing | After washing | Before washing | After washing |
| 2.5 | 7.5 | 0.5 | 2.9 | 280 | 425 | 2.9 | 3.7 | 8.8 | 8.4 |
| 2.5 | 7.5 | 1 | 3.7 | 195 | 210 | 2.7 | 2.8 | 10.5 | 12.1 |
| 2.5 | 7.5 | 3 | 3.9 | 188 | 204 | 2.2 | 2.7 | 8.5 | 6.7 |
| 2.5 | 7.5 | 6 | 4.0 | 45 | 80 | 2.2 | 2.5 | 7.7 | 7.3 |
| 1.0 | 9.0 | 1 | 3.1 | 350 | 540 | 3.5 | 3.8 | 15.3 | 12.7 |
| 1.0 | 9.0 | 3 | 3.9 | 285 | 299 | 3.1 | 3.8 | 11.1 | 13.9 |
| 1.0 | 9.0 | 6 | 4.2 | 115 | 128 | 2.9 | 3.1 | 10.0 | 9.8 |
| 10 | 0 | 6 | 0 | 3150 | — | >1800 | — | >300 | — |
| 10 | 0 | 10 | 0 | 2900 | — | >1800 | — | >300 | — |

Table 1

| Composition of the treating solution | | Increase in weight (%) | Static voltage (volt) | Half period thereof (sec) | Period or time for water-absorption (sec) |
|---|---|---|---|---|---|
| NaSS (%) | NK Ester (%) | | | | |
| 0.5 | 4.5 | 0.8 | 360 | 3.4 | 13.0 |
| 1.0 | 9.0 | 1.7 | 124 | 2.1 | 11.6 |
| 1.5 | 13.5 | 2.9 | 135 | 2.3 | 9.9 |
| 1.3 | 3.7 | 1.0 | 438 | 5.4 | 25.1 |
| 2.5 | 7.5 | 1.5 | 109 | 3.0 | 13.5 |
| 0.1 | 5.0 | 0.9 | 644 | 6.1 | 29.4 |
| 0.2 | 10.0 | 1.8 | 537 | 6.5 | 23.3 |
| 0.3 | 15.0 | 2.7 | 221 | 4.0 | 18.1 |
| 0 | 5 | 1.3 | 941 | 18.7 | 43.1 |
| 0 | 10 | 2.1 | 874 | 9.3 | 45.9 |
| 0 | 15 | 3.3 | 437 | 8.2 | 31.5 |
| 10 | 0 | 0 | 3030 | >1800 | 475 |
| Untreated fabric | | 0 | 3200 | >1800 | 530 |

REFERENCE EXAMPLE 1

Example 1 was repeated except for employing an aqueous solution containing 0.5 weight % of NaSS and 4.5 weight % of one of PEGDA (NK Ester A-1G, A-2G, A-3G, A-4G), the M.W. of polyethylene glycol being 44, 88, 132, 176 respectively. The amount of impregnation of the monomer solution in polyester fabric was adjusted to about 40%. The results are shown in Table 2.

Table 2

| NK Esters | Increase in weight (%) | Static voltage (volt) | Half period of static voltage (sec) | Period of time for water-absorption (sec) |
|---|---|---|---|---|
| A-1G | 0.7 | 2730 | >1800 | >300 |
| A-2G | 0.9 | 2440 | >1800 | >300 |
| A-3G | 1.1 | 1430 | 1260 | >300 |
| A-4G | 1.3 | 1290 | 920 | >300 |

The treated fabrics were harder than the untreated fabric. It is clear that the results show that PEGDA, M.W. of polyethylene glycol of which lower than 300, is inferior in effect for this purpose.

EXAMPLE 4

Example 1 was repeated by employing an aqueous solution containing 7.5 weight % of PEGDA (NK Ester A-9G) represented by the formula of $CH_2 = CHCOO(CH_2CH_2O)_9 - COCH = CH_2$ and having M.W. of 396 for poly (ethylene glycol) group and 2.5 weight % of sodium methacrylate (NaMAA), and impregnating the solution in polyester fabric in the amount of 50%. After the polymerization, the increase in weight was 4.8%. The treated fabric showed 8.9 seconds of period for water-absorption, 670 volts of static voltage, and 3.1 seconds of half period of static voltage. Even after washing, no substantial change was observed in these effects.

EXAMPLE 5

The same polyester fabric as used in Example 1 was immersed at 25°C for 30 minutes in the aqueous solution containing 1 weight % of NaSS and 9 weight % of PEGDA (NK Ester A-14G), M.W. of poly (ethylene glycol) group of which is 616. The fabric was squeezed with filter paper to obtain the fabric impregnated with 41.3% of the solution by weight of the fabric. The fabric was put in aluminium foil bag and sealed after replacing air therein for 2 minutes with nitrogen. The bag was heated at 120°C for 10 minutes. Then, the fabric was taken out of the bag and boiled for 2 hours in 100°C water to remove unreacted monomers and a water-soluble polymer.

The weight increase in the treated fabric was 3.9%. The fabric has a soft feeling and no coloring was observed. The fabric showed period of water-absorption of 12.4 seconds, static voltage of 299 volts and half period of static voltage of 3.1 seconds. After the washing test as in Example 1, the fabric had the excellent durability showing period of water-absorption of 11.5 seconds, static voltage of 385 volts and half period of static voltage of 3.3 seconds.

EXAMPLE 6

Example 5 was repeated except for changing reaction temperature and period of time, concentration of aqueous solution, and mixing ratio of NaSS and NK Ester A-14G. The results are shown in Table 4, in which controls when using only the NK Ester are also shown. These data clearly show the effects of employing both NaSS and NK Ester.

mined by the following manner. A swatch of the sample is supported horizontally and one drop (0.03 gram) of distilled water is applied to the sample from the height of 1 cm above the sample. The period of time is indicated by "second" for the water applied being completely absorbed and a peculiar reflection light being not observed.

Table 4

| Composition of monomers | | Reaction temperature | Reaction time | Increase in weight | Static voltage | Half period of static voltage | Period of time for water-absorption |
|---|---|---|---|---|---|---|---|
| NaSS (%) | NK Ester (%) | (°C) | (min) | (%) | (volt) | (sec) | (sec) |
| 5 | 5 | 80 | 60 | 3.1 | 225 | 3.3 | 13.5 |
| 5 | 5 | 120 | 20 | 4.0 | 280 | 2.3 | 15.1 |
| 5 | 5 | 150 | 5 | 3.9 | 280 | 2.0 | 13.0 |
| 5 | 5 | 180 | 1 | 4.1 | 190 | 1.9 | 12.1 |
| 1 | 9 | 120 | 5 | 3.7 | 485 | 3.8 | 10.5 |
| 1 | 9 | 150 | 2 | 3.8 | 455 | 3.9 | 11.7 |
| 1 | 9 | 180 | 1 | 4.2 | 440 | 3.5 | 10.9 |
| 2.5 | 2.5 | 120 | 5 | 1.8 | 315 | 3.4 | 8.9 |
| 2.5 | 2.5 | 150 | 2 | 1.9 | 320 | 3.5 | 9.1 |
| 2.5 | 2.5 | 180 | 1 | 1.9 | 310 | 2.7 | 8.7 |
| 1 | 3 | 120 | 5 | 1.2 | 480 | 4.1 | 11.5 |
| 1 | 3 | 180 | 1 | 1.5 | 450 | 4.0 | 9.0 |
| 0 | 5 | 120 | 10 | 2.1 | 1520 | 470 | 185 |
| 0 | 10 | 120 | 10 | 4.0 | 890 | 35.7 | 90 |
| 0 | 15 | 120 | 10 | 5.9 | 870 | 31.5 | 88 |

EXAMPLE 7

Example 6 was repeated except for employing potassium acrylate (KAA) and PEGDA of NK Ester A-23G. Impregnation in polyester fabric was adjusted to be about 40% by weight of the fabric. The fabric showed the excellent durability for washing in water-absorption and static voltage as shown in Table 5. No change in feeling and color was observed.

EXAMPLE 9

A swatch 8 cm × 10 cm of poly (ethylene terephthalate) poplin (yarn size No. 50; count, warp 137 and weft 72) was washed with distilled water at 100°C for 2 hours and dried at a reduced pressure. Then, the swatch was immersed in an aqueous solution of 5% by Table 5

| Composition of monomers | | Reaction temperature | Reaction time | Increase in weight | Static voltage (volt) | | Half period of static voltage (sec) | | Period of time for water-absorption (sec) | |
|---|---|---|---|---|---|---|---|---|---|---|
| KAA (%) | NK Ester (%) | (°C) | (min) | (%) | Before washing | After washing | Before washing | After washing | Before washing | After washing |
| 1 | 9 | 120 | 10 | 4.1 | 430 | 570 | 2.4 | 3.3 | 18.7 | 18.0 |
| 2.5 | 7.5 | 120 | 10 | 3.8 | 280 | 350 | 2.1 | 2.9 | 14.6 | 15.1 |
| 5 | 5 | 120 | 10 | 3.6 | 275 | 290 | 2.0 | 2.2 | 12.1 | 12.8 |
| 2 | 18 | 150 | 5 | 8.3 | 135 | 210 | 2.0 | 2.7 | 15.2 | 18.2 |
| 5 | 15 | 150 | 5 | 7.5 | 105 | 115 | 1.9 | 2.5 | 13.7 | 15.9 |
| 10 | 10 | 150 | 5 | 7.1 | 88 | 96 | 1.9 | 2.4 | 9.7 | 14.3 |
| 1 | 4 | 120 | 5 | 1.9 | 490 | 510 | 3.2 | 4.1 | 19.8 | 20.2 |
| 2.5 | 2.5 | 120 | 5 | 1.7 | 475 | 510 | 2.8 | 3.9 | 19.9 | 19.6 |

EXAMPLE 8

Polyester fabric was impregnated with about 40 weight % of the aqueous solution containing 2.5 weight % of sodium vinylsulfonate and 7.5 weight % PEGDA represented by the formula of $CH_2 = CHCOO(CH_2C-H_2O)_{120}COCH = CH_2$ and having M.W. of 5280 for poly (ethylene glycol) group. After treatment in the same way as in Example 1, the increase in weight was 3.7%. The treated fabric showed period of time for water-absorption of 35.8 seconds, static voltage of 440 volts, and half period of static voltage of 6.5 seconds, which are far superior to those of the untreated fabric. No change in color and feeling was observed.

In the following examples, the "static voltage" is determined by rubbing the sample with cotton fabric, using a rotary static tester, at 22°C and in the atmosphere of 40% R.H. The condition of the measurement is 500 grams of load, 700 r.p.m. and rubbing for 1 minute. The "half period" of static voltage indicates the period of time for the static voltage being lowered to 50% thereof. The "hygroscopic property" is determined by the following manner. A swatch of the sample weight poly (ethylene glycol) dimethacrylate represented by the formula of $CH_2 = C(CH_3)COO(CH_2C-H_2O)_{14}COC(CH_3) = CH_2$ (hereinafter referred to as PEGMA), the molecular weight (M.W.) of poly (ethylene glycol) group being 616 (tradename PEGMA-14G) and PEGMA containing no polymerization inhibitor, and of 1% by weight sodium styrene-sulfonate (NaSS) at room temperature (25°C) for 1 hour and taken out, and the sample was squeezed between filter paper so that the amount of impregnant was about 18.8% by weight of the fabric. The squeezed sample was put in an aluminium foil bag, and the bag was sealed after passing nitrogen for 2 minutes to replace air therein, followed by heating at 120°C for 10 minutes. After the heating, the sample was taken out of the bag and boiled in 100°C water for 2 hours to remove unreacted monomer and watersoluble polymer. After the treatment, the increase in weight of the fabric was 1.9%. The treated fabric was soft, showed a good feeling without coloring, and had the excellent hygroscopic and antistatic properties. As to the hygroscopic property, the treated fabric absorbed water completely in 19.1 seconds, whereas the untreated fabric hardly absorbed water even after 300 seconds. As to the antistatic property, the treated fabric showed a static voltage of 450 volts and the half period thereof of 2.2 seconds, whereas the untreated fabric showed 4900 volts and more than 1800 seconds.

For the comparison, Example 1 was repeated except for employing PEGMA (PEGMA-14G) without sodium styrene-sulfonate (hereinafter referred to as NaSS), there were obtained the treated fabrics having weight-increase of 2.2%. The control fabrics showed 49.8 seconds for absorbing water. The static voltage of the sample was 1240 volts and the half period thereof was 3.2 seconds. This control illustrates the excellent effects of the present invention in that the antistatic property and especially the hygroscopic property increase by copolymerizing PEGMA and NaSS, although both antistatic and hygroscopic properties can be improved to some extent by the treatment with PEGMA. Incidentally, water-insoluble polymer can not be formed on the surface and/or inside of the polyester fiber, when an aqueous solution of NaSS only is employed.

The durability by washing was evaluated in the following manner. 5000 ml of 0.5% aqueous solution of anionic synthetic detergent for textiles ("Hi-top" of Lion Oil and Fat Co., Japan) was employed per 1 gram of the fabric. The treated fabric was washed with the aqueous solution at 60°C for 2.5 hours with stirring. After repeating the washing for five times, this corresponding to washing five times by means of an ordinary domestic washing machine, the period of time for water-absorption, static voltage and half period thereof were measured to give 23.5 seconds, 540 volts and 3.0 seconds respectively. These data show that hygroscopic and antistatic properties of the treated fabric through polymerization by heating are not substantially impaired by way of washing.

EXAMPLE 10

Example 9 was repeated except for changing temperature and period of heating, concentration of mixed monomers, and mixing ratio of NaSS and PEGMA, the M.W. of poly (ethylene glycol) group being 616. The results are shown in Table 6, in which the data on untreated fabric, on employing PEGMA-14G only, or NaSS only are also shown. It is clearly shown the effects of employing both NaSS and PEGMA-14G. Incidentally, after the washing test as shown in Example 9, no substantial change was observed in antistatic effect and period of time for water-absorption.

Table 6

| | Composition of monomers | | Temperature of heating (°C) | Period of heating (min) | Increase in weight (%) | Static voltage (volt) | Half period of static voltage (sec) | Period of time for water-absorption (sec) |
|---|---|---|---|---|---|---|---|---|
| | NaSS[a] (%) | PEGMA-14G[a] (%) | | | | | | |
| Examples | 10 | 10 | 120 | 10 | 0.8 | 950 | 4.3 | 87.7 |
| | 10 | 10 | 120 | 20 | 2.3 | 610 | 3.0 | 25.4 |
| | 10 | 10 | 150 | 5 | 1.5 | 660 | 2.5 | 35.7 |
| | 10 | 10 | 200 | 1 | 2.0 | 630 | 2.7 | 36.5 |
| | 1 | 10 | 120 | 5 | 1.3 | 550 | 2.4 | 23.5 |
| | 1 | 10 | 150 | 5 | 2.5 | 480 | 2.3 | 26.4 |
| | 1 | 10 | 180 | 1 | 1.8 | 720 | 3.1 | 58.3 |
| | 0.5 | 10 | 120 | 10 | 3.1 | 405 | 2.0 | 18.5 |
| | 0 | 3 | 120 | 10 | 1.3 | 1630 | 3.0 | 113.5 |
| | 0 | 6 | 120 | 10 | 2.0 | 1200 | 3.2 | 60.8 |
| Controls | 10 | 0 | 120 | 10 | 0 | 4200 | >1800 | >300 |
| | Untreated fabric | | 120 | 10 | 0 | 5100 | >1800 | >300 |

[a] based on the weight of aqueous solution

EXAMPLE 11

Example 9 was repeated by employing sodium acrylate (NaAA) instead of NaSS. The treated fabric showed the excellent water-absorption and antistatic properties having durability to washing as shown in Table 7. The feeling was good and no change in color was observed.

Table 7

| | Composition of monomers | | Temperature of heating (°C) | Period of heating (min) | Increase in weight (%) | Static voltage (volt) | | Half period of static voltage (sec) | | Period of time for water-absorption (sec) | |
|---|---|---|---|---|---|---|---|---|---|---|---|
| | NaAA (%) | PEGMA-14G (%) | | | | Before washing | After washing | Before washing | After washing | Before washing | After washing |
| Examples | 1 | 10 | 120 | 5 | 1.5 | 730 | 820 | 2.6 | 3.0 | 45.3 | 60.3 |
| | 1 | 10 | 150 | 5 | 2.4 | 670 | 900 | 2.4 | 3.0 | 21.4 | 25.2 |
| Controls | 1 | 0 | 150 | 5 | 0 | 3600 | — | >1800 | — | >300 | — |
| | 5 | 0 | 150 | 5 | 0 | 3600 | — | >1800 | — | >300 | — |

EXAMPLE 12

Example 9 was repeated by employing potassium acrylate (KAA) instead of NaSS. The treated fabric showed the excellent water-absorption and antistatic properties having durability to washing as shown in Table 8. The feeling was good and no change in color was observed.

Table 8

| | Composition of monomers KAA (%) | Composition of monomers PEGMA-14G (%) | Temperature of heating (°C) | Period of heating (min) | Increase in weight (%) | Static voltage (volt) Before washing | Static voltage (volt) After washing | Half period of static voltage (sec) Before washing | Half period of static voltage (sec) After washing | Period of time for water-absorption (sec) Before washing | Period of time for water-absorption (sec) After washing |
|---|---|---|---|---|---|---|---|---|---|---|---|
| Examples | 1 | 10 | 120 | 5 | 1.7 | 650 | 800 | 2.5 | 2.8 | 40.3 | 35.2 |
| | 1 | 10 | 150 | 5 | 2.8 | 430 | 480 | 2.0 | 2.0 | 20.2 | 13.6 |
| Controls | 1 | 0 | 150 | 5 | 0 | 4200 | — | >1800 | — | >300 | — |
| | 5 | 0 | 150 | 5 | 0 | 2500 | — | >1800 | — | >300 | — |

EXAMPLE 13

Example 9 was repeated by employing sodium methacrylate (NaMAA) instead of NaSS. The treated fabric showed the excellent water-absorption and antistatic properties having durability to washing as shown in Table 9. The feeling was good and no change in color was observed.

EXAMPLE 15

The polyester fabric as used in Example 9 was immersed at 25°C for 1 hour in the aqueous solution containing 0.5 weight % of sodium vinylsulfonate and 4.5 weight % of PEGMA represented by the formula of $CH_2=C(CH_3)COO(CH_2CH_2O)_{20}COC(CH_3)=CH_2$. The fabric was squeezed by roller to adjust the impregna- Table 9

| | Composition of monomers NaMAA (%) | Composition of monomers PEGMA-14G (%) | Temperature of heating (°C) | Period of heating (min) | Increase in weight (%) | Static voltage (volt) Before washing | Static voltage (volt) After washing | Half period of static voltage (sec) Before washing | Half period of static voltage (sec) After washing | Period of time for water-absorption (sec) Before washing | Period of time for water-absorption (sec) After washing |
|---|---|---|---|---|---|---|---|---|---|---|---|
| Examples | 1 | 15 | 120 | 5 | 3.0 | 630 | 650 | 3.1 | 3.6 | 24.3 | 26.2 |
| | 1 | 15 | 120 | 5 | 3.8 | 520 | 480 | 2.0 | 1.8 | 20.3 | 16.5 |
| Controls | 1 | 0 | 150 | 5 | 0 | 3400 | — | >1800 | — | >3600 | — |
| | 5 | 0 | 150 | 5 | 0 | 4300 | — | >1800 | — | >3600 | — |

EXAMPLE 14

The aqueous solutions having monomers concentrations of 2.5%, 5% and 10% were prepared by employing, in the ratios of 1:3 and 1:9 by weight, NaSS and PEGMA (PEGMA-23G) represented by the formula of $CH_2=C(CH_3)COO(CH_2CH_2O)_{23}COC(CH_3)=CH_2$, the M.W. of poly (ethylene glycol) group being 1012. The sample polyester fabric as in Example 9 was immersed in the resulting solution at 25°C for 10 minutes and squeezed by roller. The impregnated fabric was put in aluminium foil bag. The bag was sealed after air therein was replaced with nitrogen, and heated at 120°C for 5 minutes. After the heating, the fabric was treated with boiling water. The results are shown in Table 10.

Table 10

| Composition of monomers NaSS | Composition of monomers PEGMA-23G | Increase in weight (%) | Static voltage (volt) | Half period of static voltage (sec) | Period of time for water absorption (sec) |
|---|---|---|---|---|---|
| 1 | 3 | 0.6 | 740 | 32.6 | 88.6 |
| 1 | 3 | 2.9 | 63 | 2.0 | 15.3 |
| 1 | 3 | 3.6 | 92 | 2.5 | 25.0 |
| 1 | 3 | 4.9 | 28 | 1.9 | 18.8 |
| 1 | 3 | 6.8 | 38 | 3.2 | 29.0 |
| 1 | 9 | 0.9 | 256 | 99.6 | 350.8 |
| 1 | 9 | 1.7 | 124 | 180.8 | 115.9 |
| 1 | 9 | 2.5 | 148 | 32.6 | 289.5 |
| 1 | 9 | 4.0 | 30 | 19.6 | 28.2 |
| 1 | 9 | 6.3 | 35 | 15.4 | 30.1 |

From the above data, the effects of this invention are clearly shown, since the untreated fabric showed, under the same condition, static voltage of 3200 volts, half period thereof of more than 1800 seconds and period of time for water-absorption of 500 seconds. No substantial change in these effects was observed after washing as in Example 9.

tion rate to about 50%. After the treatment as in Example 9, the increase in weight was 2.4%. The treated fabric showed static voltage of 318 volts, half period thereof of 25.6 seconds and period of time for water-absorption of 36.0 seconds. The color and feeling of the treated fabric does not differ from those of the untreated fabric. No substantial change in static voltage and period of time for water-absorption was observed after the washing test shown in Example 9.

EXAMPLE 16

A swatch 8 cm × 10 cm of poly (ethylene terephthalate) poplin (yarn size No. 50; count, warp 137 and weft 72) was washed with distilled water at 100°C for 2 hours and dried at a reduced pressure. Then, the swatch was immersed in an aqueous solution of 5% by weight poly (ethylene glycol) dimethacrylate (hereinafter referred to as PEGMA), the molecular weight (M.W.) of poly (ethylene glycol) group being 316 and PEGMA containing no polymerization inhibitor, and of 0.5% by weight sodium styrene-sulfonate at room temperature (25°C) for 1 hour and taken out, and the sample was squeezed between filter paper so that the amount of impregnant was about 35.6% by weight of the fabric. The squeezed sample was put in an aluminium foil bag, and the bag was sealed after passing nitrogen for 2 minutes to replace air therein, followed by irradiation with an electron beam from a Van de Graaf accelerator of 1.5 NeV and 50 μ A using a conveyer. After the irradiation of total dose of 3 Mrad, the sample was taken out of the bag and boiled in 100°C water for 2 hours to remove unreacted monomer and water-soluble polymer. After the treatment, the increase in weight of the fabric was 2.9%. The treated fabric was soft, showed a good feeling without coloring, and had the excellent hygroscopic and antistatic properties. As to the hygroscopic property, the treated fabric absorbed water completely in 3.4 seconds, whereas the untreated fabric hardly absorbed water even after 300 seconds. As to the antistatic property, the treated fabric showed a static voltage of 920 volts and the half period thereof of 2.0 seconds, whereas the untreated fabric showed 4900 volts and more than 1800 seconds.

For the comparison, Example 16 was repeated except for employing PEGMA without sodium styrenesulfonate (hereinafter referred to as NaSS), there were obtained the treated fabrics having weight-increase of 1.9% and that of 3.8% respectively. The control fabrics showed 60.8 seconds and 34.2 seconds respectively for absorbing water. The static voltage of the samples was 1360 volts and 1040 volts respectively, and the half period thereof was 2.8 seconds and 3.4 seconds respectively. This control illustrates the excellent effects of the present invention in that the antistatic property and especially the hygroscopic property increase by copolymerizing PEGMA and NaSS, although both antistatic and hygroscopic properties can be improved to some extent by the treatment with PEGMA. Incidentally, no water-insoluble polymer can not be formed on the surface and/or inside of the polyester fiber, when an aqueous solution of NaSS only is employed.

The durability of washing was evaluated in the following manner. 5000 ml of 0.5% aqueous solution of anionic synthetic detergent for textiles ("Hi-top" of Lion Oil and Fat Co., Japan) was employed per 1 gram of the fabric. The treated fabric was washed with the aqueous solution at 60°C for 2.5 hours with stirring. After repeating the washing for five times, this corresponding to washing five times by means of an ordinary domestic washing machine, the period of time for water-absorption, static voltage and half period thereof were measured to give 2.8 seconds, 980 volts and 3.2 seconds respectively. These data show that hygroscopic and antistatic properties of the treated fabric are not substantially impaired by way of washing.

EXAMPLE 17

Example 16 was repeated except for changing the mixing ratio, concentration of the aqueous solution and dose of irradiation. The results are shown in Table 11. These data clearly show the effect of employing both NaSS and PEGMA.

Table 11

| | Composition of the treating solution | | Dose of irradiation (Mrad) | Increase in weight (%) | Static voltage (volt) | Half period thereof (sec) | Period of time for water-absorption (sec) |
|---|---|---|---|---|---|---|---|
| | NaSS(%)[a] | PEGMA(%)[a] | | | | | |
| Examples | 2.5 | 5 | 1 | 1.6 | 460 | 1.9 | 9.6 |
| | 2.5 | 5 | 3 | 1.9 | 224 | 2.4 | 14.2 |
| | 3.0 | 10 | 1 | 3.6 | 940 | 3.2 | 3.4 |
| | 1.0 | 10 | 1 | 3.9 | 84 | 1.8 | 8.5 |
| | 1.0 | 10 | 3 | 4.9 | 36 | 1.7 | 8.2 |
| | 0.5 | 10 | 3 | 3.9 | 128 | 1.8 | 8.0 |
| Controls | 0 | 5 | 3 | 1.9 | 1360 | 2.8 | 60.8 |
| | 0 | 7 | 3 | 2.8 | 1040 | 3.4 | 34.2 |
| | 10 | 0 | 3 | 0 | 3200 | >1800 | >300 |
| Untreated fabric | | | 3 | 0 | 4900 | >1800 | >300 |

[a] % by weight of the aqueous solution

It is noted that both the antistatic and hygroscopic properties increase in the presence of even a small amount of NaSS in addition of PEGMA. According to the washing test as shown in Example 16, both the antistatic property and period of time for water-absorption did not change substantially.

EXAMPLE 18

Example 16 was repeated except for employing sodium acrylate (hereinafter referred to as NaAA) as an alkali metal salt of an acidic monomer, instead of NaSS. The results exhibited the excellent hygroscopic and antistatic properties as well as durability by washing without changing feeling and color of the fabric, as shown in Table 12.

Table 12

| | Composition of the treating solution | | Dose of irradiation | Increase in weight | Static voltage (volt) | | Half period thereof (sec) | | Period of time for water-absorption (sec) | |
|---|---|---|---|---|---|---|---|---|---|---|
| | NaAA (%) | PEGMA (%) | (Mrad) | (%) | Before washing | After washing | Before washing | After washing | Before washing | After washing |
| Examples | 5 | 15 | 1 | 5.5 | 380 | 520 | 1.5 | 2.0 | 3.4 | 3.5 |
| | 2.5 | 0 | 1 | 7.9 | 180 | 250 | 2.3 | 1.8 | 4.2 | 3.5 |
| Controls | 5 | 15 | 1 | 0 | 3600 | — | >1800 | — | >300 | — |
| | 5 | 0 | 3 | 0 | 3900 | — | >1800 | — | >300 | — |

EXAMPLE 19

Example 16 was repeated except for employing potassium acrylate (hereinafter referred to as KAA) as an alkali metal salt of an acidic monomer, instead of NaSS. The results exhibited the excellent hygroscopic and antistatic properties as well as durability by washing without changing feeling and color of the fabric, as shown in Table 13.

Table 13

| | Composition of the treating solution | | Dose of irradiation | Increase in weight | Static voltage (volt) | | Half period thereof (sec) | | Period of time for water-absorption (sec) | |
|---|---|---|---|---|---|---|---|---|---|---|
| | KAA (%) | PEGMA (%) | (Mrad) | (%) | Before washing | After washing | Before washing | After washing | Before washing | After washing |
| Examples | 5 | 15 | 1 | 5.8 | 420 | 630 | 2.4 | 3.0 | 14.8 | 10.5 |
| | 2.5 | 10 | 1 | 4.9 | 248 | 350 | 1.9 | 2.5 | 40.0 | 21.3 |

Table 13-continued

| | Composition of the treating solution | | Dose of irradiation | Increase in weight | Static voltage (volt) | | Half period thereof (sec) | | Period of time for water-absorption (sec) | |
|---|---|---|---|---|---|---|---|---|---|---|
| | KAA (%) | PEGMA (%) | (Mrad) | (%) | Before washing | After washing | Before washing | After washing | Before washing | After washing |
| Controls | 0 | 0 | 1 | 0 | 3900 | — | >1800 | — | >300 | — |
| | 0 | 0 | 8 | 0 | 2600 | — | >1800 | — | >300 | — |

EXAMPLE 20

Example 16 was repeated except for employing sodium methacrylate (hereinafter referred to as NaMAA) as an alkali metal salt of an acidic monomer, instead of NaSS. The results exhibited the excellent hygroscopic and antistatic properties as well as durability by washing without changing feeling and color of the fabric, as shown in Table 14.

Table 14

| | Composition of the treating solution | | Dose of irradiation | Increase in weight | Static voltage (volt) | | Half period thereof (sec) | | Period of time for water-absorption (sec) | |
|---|---|---|---|---|---|---|---|---|---|---|
| | NaMAA (%) | PEGMA (%) | (Mrad) | (%) | Before washing | After washing | Before washing | After washing | Before washing | After washing |
| Examples | 5 | 15 | 1 | 4.2 | 520 | 680 | 2.5 | 3.0 | 15.9 | 12.3 |
| | 2.5 | 15 | 1 | 6.1 | 380 | 450 | 2.1 | 2.9 | 24.6 | 19.5 |
| Controls | 5 | 0 | 1 | 0 | 2900 | — | >1800 | — | >300 | — |
| | 5 | 0 | 3 | 0 | 3300 | — | >1800 | — | >300 | — |

What we claim is:

1. A method of imparting durable antistatic and hygroscopic properties to a polyester fiber material comprising ethylene terephthalate component, which comprises treating the fiber material with a mixture of one weight part of poly (ethylene glycol) dimethacrylate and/or diacrylate, the molecular weight of said poly (ethylene glycol) group being about 300–10,000, and 1 part or less by weight of an alkali metal salt and/or ammonium salt of an ethylenically unsaturated organic acid and then forming a water-insoluble polymer on the surface and inside of the fiber material.

2. A method of claim 1, in which is employed poly (ethylene glycol) dimethacrylate and/or diacrylate in which the molecular weight of its ethylene glycol group is about 400–6,000.

3. A method of claim 2, in which said polyester fiber is selected from the group consisting of
   i. a poly (ethylene terephthalate) fiber,
   ii. a copolymeric polyester fiber comprising ethylene terephthalate as a component,
   iii. a fiber comprising said fiber (i) as a major component, and
   iv. a fiber comprising said fiber (ii) as a major component.

4. A method of claim 2, in which a mixture of poly (ethylene glycol) dimethacrylate and/or diacrylate and an alkali metal salt and/or ammonium salt of an ethylenically unsaturated organic acid is employed in the form of an aqueous solution.

5. A method of claim 2, in which said ethylenically unsaturated organic acid component is selected from the group consisting of styrene-sulfonic acid, vinyl-sulfonic acid, methacrylic acid and acrylic acid.

6. A method of claim 2, in which polymerization is carried out so that percent of weight increase is about 0.1 – 20% by weight of the polyester fiber material to be treated.

* * * * *